US009426601B2

(12) United States Patent
Hu et al.

(10) Patent No.: US 9,426,601 B2
(45) Date of Patent: *Aug. 23, 2016

(54) METHOD AND APPARATUS FOR DYNAMIC SERVICE PROVISIONING FOR MACHINE TO MACHINE (M2M) DEVICES IN A COMMUNICATIONS NETWORK

(71) Applicant: AT&T Intellectual Property I, L.P., Atlanta, GA (US)

(72) Inventors: Qingmin Hu, Sammamish, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,341

(22) Filed: Nov. 2, 2015

(65) Prior Publication Data

US 2016/0057560 A1    Feb. 25, 2016

Related U.S. Application Data

(63) Continuation of application No. 13/246,449, filed on Sep. 27, 2011, now Pat. No. 9,179,241.

(51) Int. Cl.
*H04W 4/00* (2009.01)
*H04L 12/24* (2006.01)
*H04L 29/08* (2006.01)

(52) U.S. Cl.
CPC .......... *H04W 4/001* (2013.01); *H04L 41/5054* (2013.01); *H04W 4/005* (2013.01); *H04L 67/34* (2013.01)

(58) Field of Classification Search
CPC .... H04W 4/005; H04W 4/001; H04L 41/5054; H04L 67/34
See application file for complete search history.

(56) References Cited

U.S. PATENT DOCUMENTS

| 7,515,042 | B2 | 4/2009 | Benco et al. |
| 8,639,245 | B2 | 1/2014 | Shi et al. |
| 9,179,241 | B2 * | 11/2015 | Hu ......................... H04W 4/001 |
| 2005/0289053 | A1 | 12/2005 | Ruttenberg |
| 2006/0265499 | A1 | 11/2006 | Menasce et al. |
| 2008/0293411 | A1 | 11/2008 | Hinton et al. |

* cited by examiner

*Primary Examiner* — Mark Rinehart
*Assistant Examiner* — Gbemileke Onamuti

(57) ABSTRACT

A method and non-transitory computer readable medium for provisioning services for machine to machine communication devices in a communications network. For example, the method receives a request from a third party service provider to provision a service to a user of the third party service provider, determines whether a communication network service provider of the communications network and the third party service provider have a pre-existing agreement to provision the service, and provisions the service of the third party service provider to the user via the communications network in accordance with the pre-existing agreement, wherein the user is a subscriber of the communication network service provider.

20 Claims, 4 Drawing Sheets

METHOD AND APPARATUS FOR DYNAMIC SERVICE PROVISIONING FOR MACHINE TO MACHINE (M2M) DEVICES IN A COMMUNICATIONS NETWORK

This application is a continuation of U.S. patent application Ser. No. 13/246,449, filed Sep. 27, 2011, now U.S. Pat. No. 9,179,241, which is herein incorporated by reference in its entirety.

The present disclosure relates generally to machine to machine communications and, more particularly, to a method and apparatus for dynamic service provisioning for machine to machine devices in a communications network.

BACKGROUND

Machine to machine (M2M) communication provides huge growth opportunities for communication network service providers, e.g., both cellular network operators and mobile service providers. At the same time, it also presents some challenges to the mobile network. Most of the M2M devices are low powered, low bandwidth devices which are grouped under one subscription. Group subscription management manually via the communication network provider is often the default option.

Managing these devices automatically and individually would be desirable if not required in many cases. However, with the increasing number of M2M services this can cause a burdensome amount of processing requirements on the communication network provider. For example, every M2M communication between an end user and a third party service provider must be managed by the communication network provider. This processing can be overwhelming for the communication network and the communication network service provider.

SUMMARY

In one embodiment, the present disclosure provides a method for provisioning services for machine to machine communication devices in a communications network. In one embodiment, the method receives a request from a third party service provider to provision a service to a user of the third party service provider, determines whether a communication network service provider of the communications network and the third party service provider have a pre-existing agreement to provision the service, and provisions the service of the third party service provider to the user via the communications network in accordance with the pre-existing agreement, wherein the user is a subscriber of the communication network service provider.

In another embodiment, the present disclosure provides a method for changing a parameter associated with a machine to machine communication service to a user in a communications network. In one embodiment, the method receives a request from a machine to change the parameter associated with the machine to machine communication service from a third party service provider to the user, determines whether the machine is authorized to access a database in the communications network to change the parameter and if the machine is authorized, grants an access to the machine to change the parameter in the communications network of a communication network service provider.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for changing a parameter associated with a machine to machine communication service to a user in a communication network and a method for provisioning services for machine to machine devices in a communications network. Machine to machine (M2M) communication provides huge growth opportunities for communication network service providers such as, for example, cellular and mobile service providers.

M2M communication includes communications associated with a subscription service provided by a third party service provider. For example, a user's refrigerator may be programmed to automatically order groceries from a grocery store on a periodic basis or when a particular item runs low. Traditionally, when this type of communication occurs, the requests run through a communication network of a communication network service provider. As a result, the communication network service provider is responsible for provisioning and updating information associated with these types of M2M communications.

Each subscriber may have many machines used for M2M communications and there may be many subscribers for each third party service provider. This again may be multiplied over many third party service providers. As a result, the potential number of transactions the communication network service provider may be required to process may be extraordinary.

In one embodiment, a more efficient method of processing the M2M communications is to automatically provision services based on pre-existing agreements with a third party service provider and allow the third party service provider or a user to directly modify any changes to subscription information associated with a subscription service of the user. The method would also provide a mechanism for dynamic provisioning of new services by service providers for M2M devices and the ability to provide different type of services for different groups of M2M devices within the network. This would greatly reduce the processing load of the communication network service provider.

Figure 1:
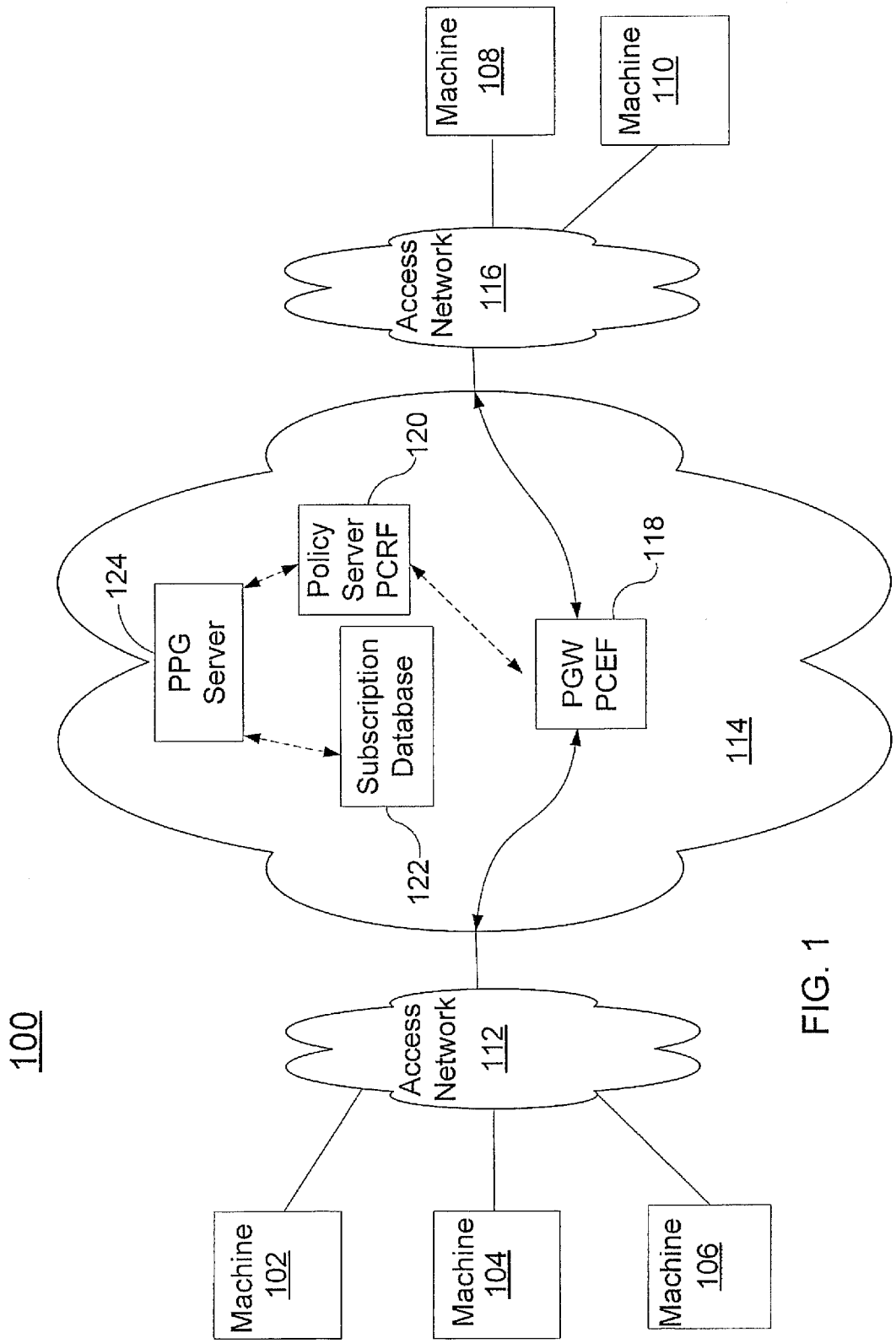
FIG. 1 illustrates one example of a communications network of the present disclosure.

FIG. 1 is a block diagram depicting one example of a communications network 100. For example, the communications network 100 may be any type internet protocol (IP) network such as a cellular network, e.g., a long term evolution (LTE) network, and the like, related to the current disclosure. It should be noted that an IP network is broadly defined as a network that uses Internet Protocol to exchange data packets.

In one embodiment, the network 100 may comprise one or more machines 102, 104 and 106 of one or more users, one or more access networks 112 and 116 of the same operator or different operators (e.g., a wired and a wireless access), a core network 114 and one or more machines 108 and 110 of one or more third party service providers. In one embodiment, the machines 102, 104, 106, 108 and 110 may be any type of machine capable of communicating over the network communications network 100. For example, the machines 102, 104, 106, 108 and 110 may be any type of smart hardware devices or appliances such a refrigerator, a smartphone, a set top box, a modem, a terminal adaptor, a server, a computer and the like. It should be noted that the present disclosure is not limited to any particular type of machines.

In one embodiment, the access networks 112 and 116 may be any type of access network such as a cellular network, a wireless network, a Wi-Fi network, a PSTN network, an IP network and the like. The access networks 112 and 116 may be operated by the same operator or by different operators. The access networks 112 and 116 and the core network 114 may include additional network elements that are not disclosed. For example, the access networks 112 and 116 and the core network 114 may also include border elements, gateways, routers, switches, call control elements, various application servers and the like.

In one embodiment, the core network 114 may include elements as defined by the 3GPP standard, for example, a Packet Data Network (PGW), Policy Control Enforcement Function (PCEF) 118 (broadly an application server), a Policy Control and Charging Rules Function (PCRF) 120, a subscription database 122 and a new network element proposed in this disclosure, namely, the Policy based Provisioning Gateway (PPG) 124. The PPG resides in the operator's network. It should be noted that the above described functions can be implemented separately in separate hardware, or alternatively, they can be implemented in one or more application servers.

In one embodiment, the PPG 124 provides an interface between users or third party service providers and the communication network of the communication network service provider. At a high level, the PPG 124 takes M2M service information update requests from the third party service provider and/or users or service provisioning requests from the third party service providers who have a relationship with the communication network service provider. For example, a communication network service provider may enter into a pre-existing agreement with a third party service provider to provision a predetermined number of subscription based services and to allow the third party service provider to access the subscription database 122 directly and modify one or more fields within the subscription database 122 operated by the communication network service provider.

In one example, the communication network service provider may be associated with the core network 114. Notably, the subscription database 122 lies within the core network 114 and is controlled by the communication network service provider of the core network 114. Thus, when a request to provision services or change subscription information associated with a user of subscription services provided by the third party service provider is received by the PPG 124, the PPG 124 may communicate with the PCRF 120 to determine if the third party service provider or the user is authorized to change subscription information or if the third party service provider is authorized to provision services. If the third party service provider is authorized, the PCRF 120 can (1) indicate to the PCEF 118 to allow establishment of a connection between a machine 108 of the third party service provider and (2) enable access to the subscription database 122 to allow the third party service provider to directly provision services or change subscription information in accordance with the pre-existing agreement.

In one embodiment, the subscription database 122 may include a plurality of subfields. For example, for each subscriber or user, the subscription database 122 may include fields such as a name, an address, a subscription, a name of third party service provider for each subscription, a subscription level, subscription access and the like. In one embodiment, the communication network service provider may specify which subfields the third party service provider or the user may have direct access to change or modify. For example, the communication network service provider may only authorize the third party service provider or the user to modify subfields that are associated with subscription services provided by the third party service provider.

To illustrate, in one example, the third party service provider may be a grocery store A. The user is a subscriber to grocery store A's fresh grocery service. The user's machine 102 may be a smart refrigerator that can detect when certain items are low and automatically send a M2M communication to the machine 108 of the grocery store A to order more eggs.

As a result, the machine 108 may send a request to the PPG 124 to request to modify the subscription database 122. The subscription database 122 may include information of the user, e.g., including the user's name, the user's address, the user's subscription to a newspaper B, a delivery frequency of newspaper B, the user's subscription to fresh grocery service from grocery store A, a delivery frequency of groceries and the like. The communication network service provider may have negotiated a pre-existing agreement with the grocery store A to only allow the grocery store A to modify the subfields "subscription to fresh grocery service" and "delivery frequency of groceries." Notably, the grocery store A would not be authorized to modify any subfield related to the user's subscription to newspaper B. However, the user may be authorized to modify subfields associated with the grocery store A and the newspaper B. The authorizations in accordance with the pre-existing agreement may be stored in the PCRF.

Thus, when the PPG 124 receives the request, the PPG 124 may communicate with the PCRF 120 to determine if the grocery store A is authorized to modify the delivery frequency for eggs to the present date versus the stored delivery frequency. The PCRF 120 may authorize the grocery store A based upon the stored policies. The PCEF 118 may then establish a connection between the PPG 124 and the subscription database 122. As a result, the grocery store A would be able to directly modify the frequency for delivering groceries such that the user may order eggs immediately and the user's request may be fulfilled.

Notably, in one embodiment, the PPG 124 acts as an interface between the grocery store A and the communication network service provider. Thus, the use of the PPG 124 allows third party service providers and end users to directly access subscription information stored in the subscription database 122 that is controlled by the communication network service provider. As a result, the communication network service provider may be relieved from a large processing requirement to process the millions of M2M communications having change requests or provisioning requests that may occur on a daily basis.

However, the communication network service provider still maintains control over its subscription database 122. In addition, the communication network service provider may still maintain traffic engineering control. For example, the communication network service provider may specify with the third party service provider when the requests may be made, when access to the subscription database 122 may be made, how many requests per time period may be made and so forth.

Figure 2:
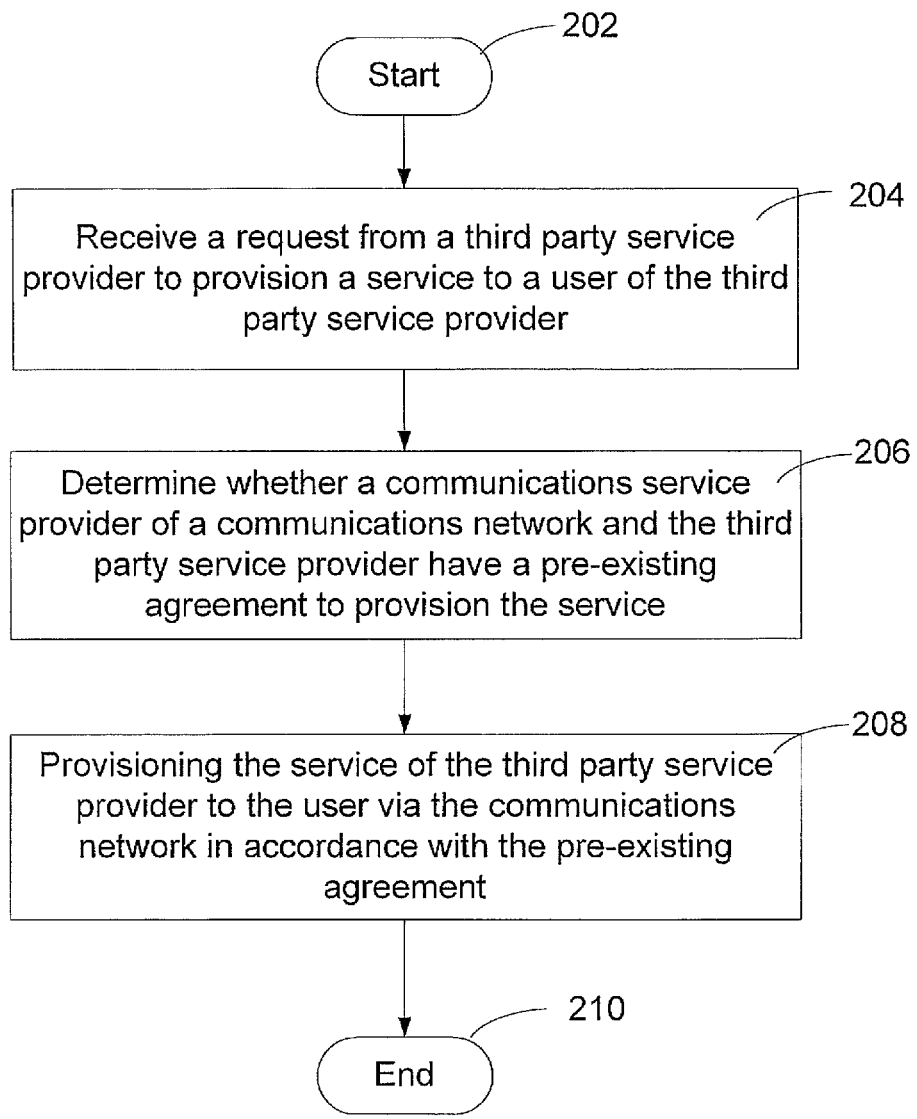
FIG. 2 illustrates an example flowchart of a method for provisioning services for machine to machine devices in a communications network.
Figure 4:
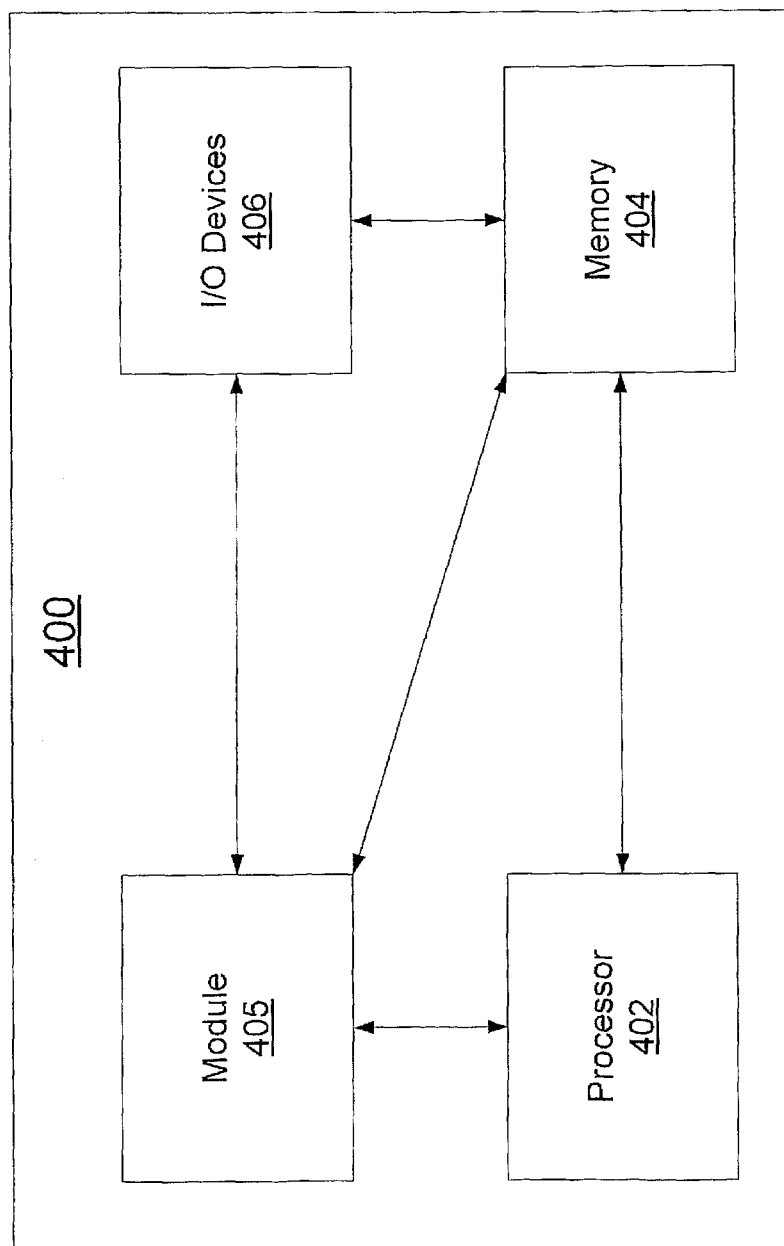
FIG. 4 illustrates a high-level block diagram of a general-purpose computer suitable for use in performing the functions described herein.

FIG. 2 illustrates a flowchart of a method 200 for provisioning services for machine to machine communication devices in a communications network. In one embodiment, the method 200 may be performed by an application server, e.g., the PPG server 124 or a general purpose computer as illustrated in FIG. 4 and discussed below.

The method 200 begins at step 202 and proceeds to step 204. At step 204, the method 200 receives a request from a third party service provider to provision a service to a user of the third party service provider. For example, a user may request to establish a new subscription to a service provided by a third party service provider. For example, a user using a smartphone may request to initiate a new subscription to receive a newspaper every Sunday from a newspaper company. After the new request is initiated by the user, a machine, e.g., a server, of the news paper company may send a request to the PPG server 124 to provision the service to the user.

At step 206, the method 200 determines whether a communication network service provider and the third party service provider have a pre-existing agreement to provision the service. In one embodiment, the third party service provider may have a pre-existing agreement with the communication network service provider to automatically provision a pre-defined number of subscription services for new users.

Using the above example, the newspaper company may enter into an agreement with the communication network service provider to automatically provision up to 1,000 subscriptions. This pre-existing agreement may be stored in the PCRF 120 or in the subscription database. As a result, when the request is received by the PPG server 124, the PPG server 124 may check with the PCRF 120 to determine if less than 1,000 subscriptions have been provisioned. If not, the PCRF 120 may inform the PPG server 124 that the request to provision the new service is authorized.

In one embodiment, the PPG server 124 allows $3^{rd}$ party service providers access to the subscription database 122. The newspaper company may then proceed to modify the subscription database by entering a new entry for the user and associated newspaper subscription information such as the user's name, address, frequency of delivery and the like.

At step 208, the method 200 provisions the service of the third party service provider to the user via the communications network in accordance with the pre-existing agreement. For example, such provisioning may allow the setup of a newspaper delivery service for a newspaper (or more broadly, a periodical) to be delivered to the user's home, place of business or an electronic form of the newspaper to be delivered to the user's electronic reader or smartphone on a daily basis via the communication network 114. Thus, the user is provisioned his or her service, e.g., a newspaper, of the third party service provider, e.g., the newspaper company. It should be noted that in one embodiment, the user is also a subscriber of the communication network service provider, e.g., receiving a telecommunication service and the like.

It should be noted that once the service is provisioned, one or more parameters associated with the subscription may be modified directly by either the user or the third party service provider using the method 200 described above. The method 300 ends at step 310.

Figure 3:
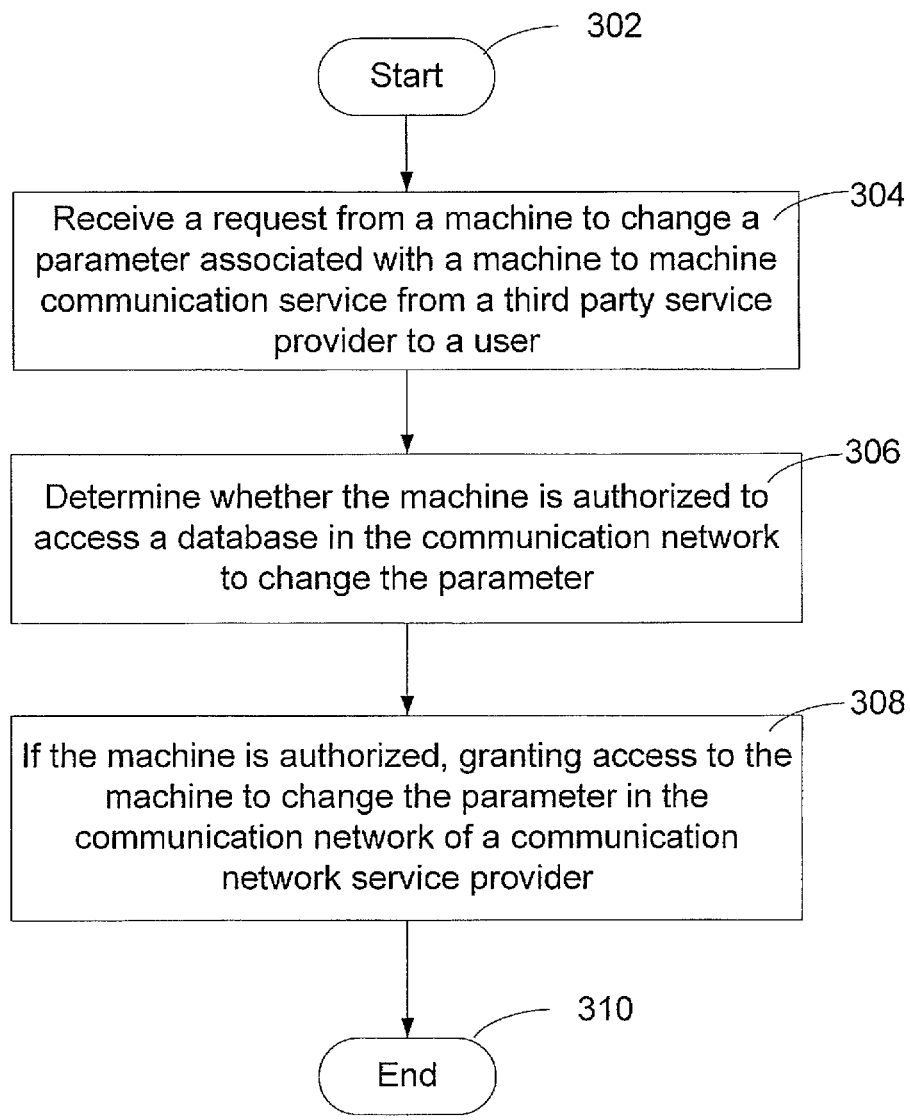
FIG. 3 illustrates an example flowchart of a method for changing a parameter associated with a machine to machine communication service to a user in a communication network.

FIG. 3 illustrates a flowchart of a method 300 for changing a parameter associated with a M2M communication service to a user in a communication network. In one embodiment, the method 300 may be performed by an application server, e.g., the PPG server 124 or a general purpose computer as illustrated in FIG. 4 and discussed below.

The method 300 begins at step 302. At step 304, the method 300 receives a request from a machine to change a parameter associated with a machine to machine communication service from a third party service provider to a user. In one embodiment, the request may be received from a machine of a third party service provider in response to a request sent from a user. In another embodiment, if the user has a sophisticated machine such as a smartphone, for example, the user may send the request directly via his or her machine.

In one embodiment, a user may have one or more machines that are subscribed to a service from the third party service provider. For example, the user may have grocery subscription to automatically order eggs from an online grocery store once every week. As a result, a smart refrigerator may be programmed to initiate a request to the online grocery store every Monday to order eggs.

In one embodiment, a database may store parameters associated with the user's subscription in a communication network that is used by the smart refrigerator and a machine, e.g., a server, of the online grocery store to communicate via M2M communications. For example, the database may have subfields that indicate the user's name, user's address, the names of the third party service providers and subscription information associated with a subscription of the third party service provider. Thus, in the above example, one entry in the database for John Doe may have subfields associated with John Doe's address, a subscription to the online grocery store, and a parameter indicating that eggs are to be delivered every Monday.

However, if the smart refrigerator detects that eggs are needed before Monday, the smart refrigerator may initiate a request to the online grocery store to order eggs immediately. As a result, the request may be sent via a M2M communication over the communication network to the server of the online grocery store. The server of the online grocery store may then send a request to the PPG server 124 to request to access the subscription database 122 of the communication network service provider to change a parameter associated with the delivery frequency of eggs to John Doe.

At step 306, the method 300 determines whether the machine is authorized to access a database in the communication network to change the parameter. Using the above example, the PPG server 124 may then check with the PCRF 120 to determine whether the machine of the online grocery store is authorized to change the delivery frequency of eggs parameter in the subscription database 122.

In one embodiment, the third party service provider and the communication network service provider may enter into a pre-existing agreement. For example, the pre-existing agreement may specify which entries, fields and/or subfields in the subscription database 122 the third party service provider may have access to for modification. In addition, the pre-existing agreement may specify a time of day the subscription database 122 may be accessed, how many times a day the subscription database 122 may be accessed and the like. In one embodiment, a similar agreement may be made with the user specifying which subfields in the subscription database 122 that the user may be authorized to modify. The access policies of the pre-existing agreement may be stored in the PCRF 120. Furthermore, authentication (e.g., sign-on names, passwords, and the like) may be employed to ensure that the proper parties are entitled to access the database. Furthermore, the user and/or the third party service provider may set a predefined limit as to the degree that a machine initiated change may alter a field in the database. For example, the ability to allow a machine to initiate a change in the online order of grocery may be limited by the total dollar value, by frequencies of the online orders, the time of day, the day of the week, the type of machine, and so on. This will provide a safeguard in the event that there may be a failure or malfunction of the machine, or even a malicious third party who may gain unauthorized access to the machine.

In another embodiment, as discussed above, the user may directly request to change a parameter of the subscription database 122 with their machine, e.g., a smartphone. Thus, the PCRF 120 may also determine if the user's machine is authorized based upon information such as, for example, whether the user has a subscription to a service of a third party service provider that the communication network service provider has a pre-existing agreement with.

At step 308, the method 300 grants access to the machine to change the parameter in the communication network of a communication network service provider if the machine is authorized. In one embodiment, if the machine of the third party service provider or the machine of the user is authorized, the PCRF 120 would indicate that to the PPG 124. As a result, the PPG server 124 may grant subscription database access to the machine or the third party service provider or the machine of the user and help provide a secure interface between the subscription database 122 in the communications network 114 of the communication network service provider and the third party service provider.

In one embodiment, once communication is established, the third party service provider or the user may directly change any parameters that they are authorized to change. Using the above example, the online grocery store may then access the subscription database 122 to update the delivery frequency of eggs to the present date so that the user will receive their order for eggs. Subsequently, if the user wants to return the delivery frequency back to every Monday, the online grocery store may then again change the delivery frequency back to every Monday once the user's request is fulfilled. The method 300 ends at step 310.

As a result, the embodiments of the present disclosure provide for an automated way to allow third party service providers to directly change one or more parameters stored in a database of a communication network service provider's communication network. This alleviates processing loads on the communication network service provider, while still allowing them to maintain proper security and traffic control within their communication network. As a result, a more efficient management of M2M communications and M2M subscription services is provided.

It should be noted that although not explicitly specified, one or more steps of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for changing a parameter associated with a M2M communication service to a user in a communications network or provisioning services for M2M devices in a communications network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for changing a parameter associated with a M2M communication service to a user in a communications network or provisioning services for M2M devices in a communications network can be loaded into memory 404 and executed by processor 402 to implement the functions as discussed above. As such, the present methods 405 for changing a parameter associated with a M2M communication service to a user in a communications network or provisioning services for M2M devices in a communications network (including associated data structures) of the present disclosure can be stored on a non-transitory (physical and tangible) computer readable storage medium, e.g., RAM memory, magnetic or optical drive or diskette and the like. For example, the processor 402 can be programmed or configured with instructions (e.g., computer readable instructions) to perform the steps of methods 200 and 300.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    receiving, by a processor of a communications network, a request from a third party service provider to provision a delivery service of a product to a user in response to a previous request sent to the third party service provider via a machine to machine communication that is initiated from a machine of the user, wherein the third party service provider provides the delivery service of the product, wherein the user is a subscriber of a communication service provided by a communications network service provider of the communications network, wherein the previous request comprises a request that occurred earlier in time than the request;
    determining, by the processor, that the communications network service provider of the communications network and the third party service provider have a pre-existing agreement to provision the delivery service of the product; and provisioning, by the processor, the delivery service of the product of the third party service provider to the user via the communications network in accordance with the pre-existing agreement, wherein the provisioning comprises allowing the third party service provider to modify a subscription database of the communications network service provider to include a new entry for the user and the delivery service of the product provided by the third party service provider.

2. The method of claim 1, wherein the receiving and the determining are performed by a policy based provisioning gateway.

3. The method of claim 2, wherein the delivery service of the product comprises a subscription service.

4. The method of claim 3, wherein the pre-existing agreement comprises an agreement to automatically provide a predetermined number of deliveries of the product.

5. The method of claim 4, wherein the delivery service of the product is provisioned only when a total number of the deliveries of the product is below the predetermined number of the deliveries of the product.

6. A non-transitory computer-readable medium storing a plurality of instructions which, when executed by a processor of a communications network, cause the processor to perform operations, the operations comprising:
　receiving a request from a third party service provider to provision a delivery service of a product to a user in response to a previous request sent to the third party service provider via a machine to machine communication that is initiated from a machine of the user, wherein the third party service provider provides the delivery service of the product, wherein the user is a subscriber of a communication service provided by a communications network service provider of the communications network, wherein the previous request comprises a request that occurred earlier in time than the request;
　determining that the communications network service provider of the communications network and the third party service provider have a pre-existing agreement to provision the delivery service of the product; and
　provisioning the delivery service of the product of the third party service provider to the user via the communications network in accordance with the pre-existing agreement, wherein the provisioning comprises allowing the third party service provider to modify a subscription database of the communications network service provider to include a new entry for the user and the delivery service of the product provided by the third party service provider.

7. The non-transitory computer-readable medium of claim 6, wherein the receiving and the determining are performed by a policy based provisioning gateway.

8. The non-transitory computer-readable medium of claim 7, wherein the delivery service of the product comprises a subscription service.

9. The non-transitory computer-readable medium of claim 8, wherein the pre-existing agreement comprises an agreement to automatically provide a predetermined number of deliveries of the product.

10. The non-transitory computer-readable medium of claim 9, wherein the delivery service of the product is provisioned only when a total number of the deliveries of the product is below the predetermined number of the deliveries of the product.

11. A method comprising:
　receiving, by a processor of a communications network, a request from a first machine to change a parameter associated with a machine to machine communication service from a third party service provider to a user in response to a previous request sent to the third party service provider via a machine to machine communication that is initiated from a second machine of the user, wherein the parameter is stored in a subscription database of a communications network service provider of the communications network, wherein the third party service provider provides a delivery service of a product, wherein the user is a subscriber of the delivery service of the product provided by the third-party service provider and a subscriber of the machine to machine communication service provided by the communications network service provider, wherein the previous request comprises a request that occurred earlier in time than the request;
　determining, by the processor, that the first machine is authorized to access a database in the communications network to change the parameter; and
　granting, by the processor, an access to the first machine to change the parameter of the subscription database in the communications network of the communications network service provider.

12. The method of claim 11, wherein the receiving, the determining and the granting are performed by a policy based provisioning gateway.

13. The method of claim 12, wherein the policy based provisioning gateway interfaces with the communications network and the third party service provider.

14. The method of claim 12, wherein the policy based provisioning gateway comprises a list of third party service providers that is authorized to modify the database in the communications network.

15. The method of claim 12, wherein the policy based provisioning gateway comprises a list of sub fields in the database in the communications network that the third party service provider is authorized to modify.

16. The method of claim 11, wherein the second machine comprises a user machine.

17. The method of claim 11, wherein the first machine comprises a third party service provider machine.

18. The method of claim 11, wherein the parameter to be changed by the first machine is constrained by a predefined limit.

19. The method of claim 18, wherein the predefined limit is based on a type of the first machine.

20. The method of claim 18, wherein the predefined limit is based on when the request is received from the first machine.

* * * * *